(12) United States Patent
Choltco-Devlin et al.

(10) Patent No.: US 12,091,133 B2
(45) Date of Patent: Sep. 17, 2024

(54) CINCH DIRECT MOUNT 2X RING SYSTEM

(71) Applicant: Fox Factory, Inc., Duluth, GA (US)

(72) Inventors: Evan Michael Choltco-Devlin, North Vancouver (CA); Jason Kennett, North Vancouver (CA); David Robert Edwards, Vancouver (CA)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 18/109,773

(22) Filed: Feb. 14, 2023

(65) Prior Publication Data
US 2023/0234673 A1 Jul. 27, 2023

Related U.S. Application Data

(62) Division of application No. 17/328,421, filed on May 24, 2021, which is a division of application No. (Continued)

(51) Int. Cl.
*B62M 9/10* (2006.01)
*B62M 1/36* (2013.01)
(Continued)

(52) U.S. Cl.
CPC .............. *B62M 9/105* (2013.01); *B62M 1/36* (2013.01); *B62M 3/00* (2013.01); *F16H 55/30* (2013.01)

(58) Field of Classification Search
CPC ........ B62M 9/105; B62M 3/00; B62M 3/003; B62M 1/36; Y10T 74/2165; F16H 55/30
(Continued)

(56) References Cited

U.S. PATENT DOCUMENTS 2,451,690 A * 10/1948 Oehler .................... F16H 55/30
474/160
2,468,011 A    4/1949 Hazel
(Continued)

FOREIGN PATENT DOCUMENTS

CA    2964058 A1    10/2017
CN    1830722 A    9/2006
(Continued)

OTHER PUBLICATIONS

Chinese First Action and Search Report, App No. 201710232829.8, 12 Pages, Dated Feb. 3, 2020.
(Continued)

*Primary Examiner* — Henry Y Liu (57) ABSTRACT

A cinch direct mount 2× ring system is disclosed. One embodiment discloses a chainring assembly having a drive side crank arm with a chainring assembly interface including a plurality of splines, a circumference, and an axial length. The chainring assembly includes a first chainring having a first outer diameter and a first center assembly shape. The chainring assembly includes a second chainring having a second outer diameter and a second center assembly shape, the second outer diameter being different than the first outer diameter. The chainring assembly also includes a fastener to couple the first chainring and the second chainring with the chainring assembly interface, such that at least one of the first center assembly shape or the second center assembly shape engages with the plurality of splines.

1 Claim, 12 Drawing Sheets

Related U.S. Application Data

15/953,903, filed on Apr. 16, 2018, now Pat. No. 11,014,628.

(60) Provisional application No. 62/491,958, filed on Apr. 28, 2017.

(51) Int. Cl.
*B62M 3/00* (2006.01)
*F16H 55/30* (2006.01)

(58) Field of Classification Search
USPC .......................................................... 474/160
See application file for complete search history.

(56) References Cited

U.S. PATENT DOCUMENTS

| | | | |
|---|---|---|---|
| 2,793,571 A | 5/1957 | Way et al. | |
| 3,168,836 A | 2/1965 | Militana | |
| 3,200,665 A | 8/1965 | Martin | |
| 3,272,027 A | 9/1966 | Wayman | |
| 3,304,796 A | 2/1967 | Leege | |
| 3,371,549 A | 3/1968 | Ernst | |
| 3,815,439 A | 6/1974 | Tarutani | |
| 3,903,754 A | 9/1975 | Morroni | |
| 3,905,248 A * | 9/1975 | Peyrard | B62M 9/105 |
| | | | 474/160 |
| 3,987,539 A | 10/1976 | Gravener | |
| 4,144,773 A | 3/1979 | Addicks | |
| 4,174,642 A | 11/1979 | Martin et al. | |
| 4,240,303 A | 12/1980 | Mosley | |
| 4,261,214 A | 4/1981 | Watanabe et al. | |
| RE30,758 E | 10/1981 | Lang | |
| 4,318,310 A * | 3/1982 | Segawa | B62K 19/34 |
| | | | 74/447 |
| 4,331,043 A * | 5/1982 | Shimano | B62M 3/003 |
| | | | 74/594.2 |
| 4,358,967 A | 11/1982 | Kastan | |
| 4,392,841 A | 7/1983 | Juy | |
| 4,439,172 A * | 3/1984 | Segawa | B62M 9/105 |
| | | | 74/447 |
| 4,446,753 A | 5/1984 | Nagano | |
| 4,453,924 A | 6/1984 | Sugino | |
| 4,475,894 A | 10/1984 | Sugino | |
| 4,545,691 A | 10/1985 | Kastan et al. | |
| 4,583,422 A | 4/1986 | Boyd | |
| 4,586,914 A | 5/1986 | Nagano | |
| 4,594,910 A * | 6/1986 | Nagano | B62M 9/105 |
| | | | 74/594.1 |
| 4,598,608 A * | 7/1986 | Ueno | B62M 9/105 |
| | | | 74/448 |
| 4,608,878 A | 9/1986 | Shimano | |
| 4,722,722 A | 2/1988 | Rampe | |
| 4,867,733 A | 9/1989 | Yamanoi et al. | |
| 4,889,521 A | 12/1989 | Nagano | |
| 5,003,840 A | 4/1991 | Hinschlager | |
| 5,192,248 A | 3/1993 | Nagano | |
| 5,192,249 A | 3/1993 | Nagano | |
| 5,224,903 A | 7/1993 | Langhof et al. | |
| 5,226,469 A | 7/1993 | Matsumura et al. | |
| 5,246,402 A * | 9/1993 | Romano | B62M 9/105 |
| | | | 474/160 |
| 5,285,701 A | 2/1994 | Parachinni | |
| 5,362,278 A | 11/1994 | Bergles et al. | |
| 5,413,534 A | 5/1995 | Nagano | |
| 5,451,198 A | 9/1995 | Lancaster | |
| 5,738,603 A | 4/1998 | Schmidt et al. | |
| 5,830,096 A | 11/1998 | Schmidt et al. | |
| 5,852,954 A * | 12/1998 | Yamanaka | B25B 13/48 |
| | | | 81/436 |
| 5,908,364 A | 6/1999 | Tanaka | |
| 5,935,033 A * | 8/1999 | Tseng | B62M 9/105 |
| | | | 474/155 |
| 5,947,852 A | 9/1999 | Moretz | |
| 5,984,817 A | 11/1999 | Schulz | |
| 6,007,442 A | 12/1999 | Schmidt | |
| 6,013,001 A | 1/2000 | Miyoshi | |
| 6,022,284 A | 2/2000 | Bartolozzi et al. | |
| 6,102,821 A | 8/2000 | Nakamura | |
| 6,202,506 B1 | 3/2001 | Storck et al. | |
| 6,203,462 B1 | 3/2001 | Takamori | |
| 6,564,675 B1 | 5/2003 | Jiang | |
| 6,572,500 B2 | 6/2003 | Tetsuka | |
| 6,656,072 B2 | 12/2003 | Sugita et al. | |
| 6,666,786 B2 | 12/2003 | Yahata | |
| 6,755,095 B2 | 6/2004 | Yamanaka | |
| 6,860,171 B1 * | 3/2005 | Nanko | B62M 25/02 |
| | | | 74/594.1 |
| 7,080,574 B2 | 7/2006 | Chang | |
| 7,263,914 B2 | 9/2007 | Ording et al. | |
| 7,267,030 B2 | 9/2007 | French | |
| 7,462,120 B1 * | 12/2008 | Thompson | B62M 9/105 |
| | | | 474/160 |
| 7,503,864 B2 * | 3/2009 | Nonoshita | B62M 9/105 |
| | | | 474/160 |
| 7,530,290 B2 | 5/2009 | Lin | |
| 7,610,832 B2 | 11/2009 | Guiseppe et al. | |
| 7,686,721 B2 | 3/2010 | Tabe et al. | |
| 7,699,733 B2 | 4/2010 | Sakura et al. | |
| 7,713,156 B2 | 5/2010 | Sakura et al. | |
| 7,753,815 B2 * | 7/2010 | Saifuddin | B62M 9/105 |
| | | | 474/151 |
| 7,824,287 B2 * | 11/2010 | Nonoshita | B62M 9/10 |
| | | | 474/160 |
| 7,850,564 B2 | 12/2010 | Nonoshita | |
| 7,883,437 B2 | 2/2011 | Braedt | |
| 7,942,771 B2 | 5/2011 | Kamada | |
| 7,967,709 B2 | 6/2011 | Emura et al. | |
| 8,025,304 B2 | 9/2011 | Smith | |
| 8,057,338 B2 | 11/2011 | Kamada | |
| 8,070,632 B2 | 12/2011 | Yuan | |
| 8,096,908 B2 | 1/2012 | Oishi et al. | |
| 8,226,511 B2 | 7/2012 | Kamada | |
| 8,298,104 B2 | 10/2012 | Sakura | |
| 8,479,610 B2 | 7/2013 | Valle et al. | |
| 8,550,944 B2 | 10/2013 | Esquibel | |
| 8,573,093 B2 * | 11/2013 | Valle | B62M 3/00 |
| | | | 474/160 |
| 8,616,084 B2 | 12/2013 | Meggiolan | |
| 8,820,192 B2 | 9/2014 | Staples et al. | |
| 8,882,619 B2 | 11/2014 | Braedt | |
| 8,888,631 B2 | 11/2014 | Morita | |
| 9,016,169 B2 | 4/2015 | Sugimoto et al. | |
| 9,033,835 B2 | 5/2015 | Blank et al. | |
| 9,302,733 B2 | 4/2016 | Schlanger | |
| 9,302,736 B2 | 4/2016 | Iwai et al. | |
| 9,308,967 B2 | 4/2016 | Braedt | |
| 9,328,814 B2 | 5/2016 | Wesling et al. | |
| 9,415,835 B2 * | 8/2016 | Tokuyama | B62M 9/12 |
| 9,440,706 B2 * | 9/2016 | Iwai | B62M 9/105 |
| 9,463,844 B2 | 10/2016 | Fukunaga | |
| 9,493,211 B2 | 11/2016 | Reiter et al. | |
| 9,540,070 B2 | 1/2017 | Watarai et al. | |
| 9,580,144 B2 | 2/2017 | Bernardele | |
| 9,631,714 B2 | 4/2017 | Watarai et al. | |
| 9,677,658 B2 | 6/2017 | Wickliffe | |
| 9,719,590 B2 | 8/2017 | Reiter et al. | |
| 9,725,133 B2 * | 8/2017 | Staples | B62K 19/16 |
| 9,791,033 B2 | 10/2017 | Wickliffe et al. | |
| 9,869,382 B2 | 1/2018 | Wesling et al. | |
| 9,914,502 B2 * | 3/2018 | Wu | B62M 9/105 |
| 9,919,763 B2 | 3/2018 | Iwai et al. | |
| 9,926,038 B2 | 3/2018 | Fukunaga et al. | |
| 9,932,090 B2 | 4/2018 | Yoshida et al. | |
| 9,944,351 B2 | 4/2018 | Braun et al. | |
| 9,963,196 B2 | 5/2018 | Sugimoto | |
| 9,994,285 B2 * | 6/2018 | Tokuyama | F16H 55/30 |
| 10,040,510 B2 * | 8/2018 | Sugimoto | F16H 55/30 |
| 10,053,186 B2 | 8/2018 | Braedt et al. | |
| 10,059,400 B2 | 8/2018 | Tokuyama et al. | |
| 10,155,566 B2 | 12/2018 | Sugimoto | |
| 10,221,887 B2 * | 3/2019 | Dubois | F16C 25/06 |
| 10,358,186 B2 * | 7/2019 | Sugimoto | B62M 9/105 |

(56) References Cited

U.S. PATENT DOCUMENTS

| | | | |
|---|---|---|---|
| 10,359,106 B2 | 7/2019 | Akanishi | |
| 10,359,107 B2 | 7/2019 | Young | |
| 10,377,445 B2 * | 8/2019 | Hirose | B62M 9/12 |
| 10,407,127 B2 | 9/2019 | Sugimoto | |
| 10,443,685 B2 | 10/2019 | Reiter | |
| 10,507,888 B2 | 12/2019 | Sugimoto | |
| 10,550,925 B2 * | 2/2020 | Akanishi | B62M 9/00 |
| 10,562,589 B2 | 2/2020 | Sugimoto et al. | |
| 10,578,201 B2 | 3/2020 | Reiter et al. | |
| 10,800,482 B2 | 10/2020 | Staples et al. | |
| 10,864,963 B2 | 12/2020 | Staples et al. | |
| 10,994,804 B2 | 5/2021 | Sugimoto | |
| 11,014,628 B2 | 5/2021 | Choltco-Devlin et al. | |
| 11,130,546 B2 | 9/2021 | Staples et al. | |
| 11,505,277 B1 | 11/2022 | Yamanaka | |
| 2002/0086753 A1 | 7/2002 | Yahata | |
| 2003/0097900 A1 | 5/2003 | Yamanaka | |
| 2003/0199351 A1 | 10/2003 | Nichols | |
| 2004/0070166 A1 | 4/2004 | Valle | |
| 2004/0092352 A1 | 5/2004 | Chiang | |
| 2004/0200314 A1 | 10/2004 | Hermansen et al. | |
| 2004/0204274 A1 | 10/2004 | Young | |
| 2005/0009656 A1 | 1/2005 | Preis et al. | |
| 2005/0014590 A1 | 1/2005 | Wen | |
| 2005/0032596 A1 | 2/2005 | Nonoshita et al. | |
| 2005/0039570 A1 * | 2/2005 | Nanko | B62M 25/02 74/594.1 |
| 2005/0072264 A1 | 4/2005 | Yamanaka | |
| 2005/0081678 A1 | 4/2005 | Smith | |
| 2005/0090349 A1 * | 4/2005 | Lee | B62M 9/105 474/160 |
| 2005/0199092 A1 | 9/2005 | Feltrin et al. | |
| 2005/0233850 A1 | 10/2005 | Andel | |
| 2005/0282671 A1 | 12/2005 | Emura et al. | |
| 2005/0282672 A1 | 12/2005 | Nonoshita | |
| 2006/0205549 A1 * | 9/2006 | Nonoshita | B62M 9/105 474/160 |
| 2006/0210734 A1 | 9/2006 | Lin | |
| 2006/0288819 A1 | 12/2006 | Dal et al. | |
| 2007/0034043 A1 | 2/2007 | Feltrin | |
| 2007/0049437 A1 | 3/2007 | Wickliffe | |
| 2007/0054768 A1 | 3/2007 | Miyazawa | |
| 2007/0111833 A1 | 5/2007 | Young | |
| 2007/0129193 A1 * | 6/2007 | Nonoshita | B62M 9/10 474/160 |
| 2007/0137425 A1 | 6/2007 | Dal et al. | |
| 2007/0173364 A1 | 7/2007 | Renshaw | |
| 2007/0186718 A1 | 8/2007 | Chiang | |
| 2007/0199403 A1 | 8/2007 | Ciavatta et al. | |
| 2007/0227293 A1 | 10/2007 | Valle | |
| 2007/0227294 A1 | 10/2007 | Valle | |
| 2007/0265122 A1 | 11/2007 | Emura et al. | |
| 2007/0270261 A1 | 11/2007 | Sakura et al. | |
| 2007/0283781 A1 | 12/2007 | Meggiolan | |
| 2008/0028887 A1 | 2/2008 | Valle et al. | |
| 2008/0120845 A1 | 5/2008 | Hama | |
| 2008/0176691 A1 * | 7/2008 | Saifuddin | B62M 9/105 474/144 |
| 2008/0202284 A1 | 8/2008 | Valle et al. | |
| 2008/0207369 A1 * | 8/2008 | Bouchez | B62M 9/105 474/160 |
| 2008/0272572 A1 | 11/2008 | Tsai | |
| 2008/0314193 A1 * | 12/2008 | Meggiolan | B62M 3/00 74/594.1 |
| 2009/0042681 A1 | 2/2009 | Dal et al. | |
| 2009/0042682 A1 | 2/2009 | Dal et al. | |
| 2009/0105024 A1 | 4/2009 | Sakura et al. | |
| 2009/0236777 A1 | 9/2009 | Chiang | |
| 2009/0243160 A1 | 10/2009 | Chiang | |
| 2009/0247337 A1 | 10/2009 | Sakura et al. | |
| 2010/0064845 A1 * | 3/2010 | French | B62M 3/00 29/527.2 |
| 2010/0093494 A1 | 4/2010 | Smith | |
| 2010/0326233 A1 | 12/2010 | Schlanger | |
| 2011/0126666 A1 | 6/2011 | McAinsh | |
| 2011/0167943 A1 | 7/2011 | Lermen et al. | |
| 2011/0251008 A1 | 10/2011 | Schmitz et al. | |
| 2011/0319209 A1 * | 12/2011 | Huang | B21K 1/28 29/893.3 |
| 2012/0172165 A1 | 7/2012 | Schroedl | |
| 2013/0011215 A1 | 1/2013 | Wells | |
| 2013/0087013 A1 | 4/2013 | Sugimoto et al. | |
| 2013/0139642 A1 | 6/2013 | Reiter et al. | |
| 2013/0184110 A1 | 7/2013 | Reiter | |
| 2014/0335987 A1 | 11/2014 | Iwai et al. | |
| 2015/0082939 A1 * | 3/2015 | Meyer | B62M 3/00 74/594.2 |
| 2015/0152231 A1 | 6/2015 | Ohki et al. | |
| 2015/0175241 A1 | 6/2015 | Malloy | |
| 2015/0176692 A1 | 6/2015 | Roh | |
| 2015/0198231 A1 | 7/2015 | Emura | |
| 2015/0210352 A1 * | 7/2015 | Sugimoto | B62M 9/105 474/80 |
| 2015/0210353 A1 * | 7/2015 | Tokuyama | B62M 9/12 474/160 |
| 2015/0211623 A1 | 7/2015 | Inui | |
| 2015/0217834 A1 * | 8/2015 | Iwai | B62M 9/10 474/152 |
| 2015/0337943 A1 | 11/2015 | Sugimoto | |
| 2015/0360749 A1 * | 12/2015 | Iwai | F16H 55/30 474/158 |
| 2015/0362057 A1 | 12/2015 | Wesling et al. | |
| 2016/0114859 A1 | 4/2016 | Tsai et al. | |
| 2016/0272279 A1 | 9/2016 | Yoshida et al. | |
| 2017/0029066 A1 | 2/2017 | Fukunaga et al. | |
| 2017/0146109 A1 | 5/2017 | Reiter et al. | |
| 2017/0174288 A1 * | 6/2017 | Wu | B62M 9/105 |
| 2017/0183060 A1 | 6/2017 | Braedt | |
| 2017/0234418 A1 | 8/2017 | Barefoot et al. | |
| 2017/0247081 A1 | 8/2017 | Sugimoto | |
| 2017/0274960 A1 * | 9/2017 | Dubois | F16D 1/108 |
| 2017/0292598 A1 * | 10/2017 | Moore | B22D 25/02 |
| 2018/0037296 A1 * | 2/2018 | Hamamoto | F16F 15/1245 |
| 2018/0043203 A1 * | 2/2018 | Seol | A63B 22/0605 |
| 2018/0057106 A1 * | 3/2018 | Iwai | B62M 3/00 |
| 2018/0079467 A1 * | 3/2018 | Hirose | F16H 55/30 |
| 2018/0127057 A1 * | 5/2018 | Sugimoto | B62M 9/105 |
| 2018/0134340 A1 * | 5/2018 | Emura | B62M 9/12 |
| 2018/0231060 A1 | 8/2018 | Milanesio et al. | |
| 2018/0347680 A1 * | 12/2018 | Akanishi | B62M 9/00 |
| 2018/0362113 A1 * | 12/2018 | Day | B62M 1/24 |
| 2019/0017586 A1 * | 1/2019 | Sugimoto | B62M 9/105 |
| 2019/0085899 A1 * | 3/2019 | Bernardele | F16C 19/54 |
| 2019/0152558 A1 | 5/2019 | Staples et al. | |
| 2019/0185108 A1 * | 6/2019 | Bush | F16H 55/12 |
| 2019/0210677 A1 | 7/2019 | O'Reilly | |
| 2020/0200253 A1 | 6/2020 | Klawer et al. | |
| 2020/0256446 A1 | 8/2020 | Klawer et al. | |
| 2021/0094652 A1 | 4/2021 | Staples et al. | |
| 2023/0111794 A1 | 4/2023 | Lee et al. | |

FOREIGN PATENT DOCUMENTS

| | | |
|---|---|---|
| CN | 200999089 Y | 1/2008 |
| CN | 101224782 A | 7/2008 |
| CN | 103133637 A | 6/2013 |
| CN | 107380340 A | 11/2017 |
| DE | 3130258 A1 | 6/1982 |
| DE | 3531030 A1 | 3/1987 |
| DE | 19751879 A1 | 5/1999 |
| DE | 19954432 A1 | 5/2001 |
| DE | 20218755 U1 | 2/2003 |
| DE | 102015005673 A1 | 11/2015 |
| DE | 202017107695 U1 | 3/2018 |
| EP | 0144984 B1 | 4/1989 |
| EP | 0538780 A1 | 4/1993 |
| EP | 1270393 A1 | 1/2003 |
| EP | 1281609 A2 | 2/2003 |
| EP | 1352825 A1 | 10/2003 |
| EP | 1426282 A2 | 6/2004 |
| EP | 1493654 A1 | 1/2005 |
| EP | 1619417 A2 | 1/2006 |

(56) References Cited

FOREIGN PATENT DOCUMENTS

| | | | |
|---|---|---|---|
| EP | 1884460 | A2 | 2/2008 |
| EP | 1884461 | A2 | 2/2008 |
| EP | 2423091 | A1 | 2/2012 |
| ES | 2600778 | A1 | 2/2017 |
| FR | 904975 | A | 11/1945 |
| FR | 946276 | A | 5/1949 |
| FR | 2501615 | B1 | 4/1986 |
| GB | 2005363 | B | 6/1982 |
| JP | H10181662 | A | 7/1998 |
| JP | 2005053410 | A | 3/2005 |
| TW | 200821216 | A | 5/2008 |
| TW | 201530021 | A | 8/2015 |
| WO | 2007147909 | A1 | 12/2007 |
| WO | 2010136135 | A1 | 12/2010 |

OTHER PUBLICATIONS

Chinese Second Action and Search Report, App No. 2020011439469.7, 16 Pages, Dated Mar. 8, 2022.
Chinese Third Action and Search Report, App No. 2020011439469.7, 7 Pages, Dated Aug. 18, 2022.
European Examination Report, European Patent Application No. 17166123.4, 10 Pages, Dated Mar. 18, 2020.
Google Translation of Decision of Rejection for TW Appl. No. 106112061, Feb. 26, 2018 (Year: 2018).
Google Translation of Rejection for TW Appl. No. 106112061, Jul. 30, 2018 (Year: 2018).
Inverted trapezoid—Google Search, Oct. 4, 2019, (Year: 2019).
Machine Translation of Chinese First Action and Search Report, Appl. No. 201710232829.8, Feb. 3, 2020 (Year: 2020).
Proximate definition, Dictionary.com, Sep. 28, 2022 (Year: 2022).
European Search Report, European Patent Application No. 17166123.4, Oct. 5, 2017, 9 Pages.
Decision of Rejection for TW Application No. 106112061 pp. 8, Feb. 26, 2018.
Decision of Rejection for TW Application No. 106112061 pp. 10, Jul. 30, 2018.
Chinese Fourth Action and Search Report, App No. 2020011439469.7, 24 Pages, Dated Feb. 20, 2023.
Tang, et al., "Guide for Designers of Plastic Articles", Sep. 30, 1993, p. 175.

* cited by examiner

CINCH DIRECT MOUNT 2X RING SYSTEM

CROSS REFERENCE

This application claims priority to and is a Divisional of co-pending U.S. patent application Ser. No. 17/328,421 filed on May 24, 2021, entitled "Cinch Direct Mount 2× Ring System" by Evan Choltco-Devlin et al. and assigned to the assignee of the present application, the disclosure of which is hereby incorporated herein by reference in its entirety.

The application Ser. No. 17/328,421 claims priority to and is a Divisional of U.S. patent application Ser. No. 15/953,903 filed on Apr. 16, 2018, now U.S. Issued U.S. Pat. No. 11,014,628, entitled "Cinch Direct Mount 2× Ring System" by Evan Choltco-Devlin et al. and assigned to the assignee of the present application, the disclosure of which is hereby incorporated herein by reference in its entirety.

The application Ser. No. 15/953,903 claims priority to and benefit of U.S. Provisional Patent Application No. 62/491,958 filed on Apr. 28, 2017, entitled "Cinch Direct Mount 2× Ring System" by Evan Choltco-Devlin et al. and assigned to the assignee of the present application, the disclosure of which is hereby incorporated herein by reference in its entirety.

FIELD OF THE INVENTION

Embodiments of the invention generally relate to a chainring assembly for a chain driven vehicle.

BACKGROUND

Traditional crank assemblies include one or more chainrings that are used to drive, via a chain, one or more sprockets coupled to an axle of a wheel. Chainrings are liable to bend, break or wear down based on use. Moreover, it is not uncommon to need a different size of chainring depending upon what type of terrain is being crossed or what maneuvers are being performed. As such, chainring manufacture, design and implementation are constantly being improved. However, as with almost all mechanical designs, a number of desirable features are incongruent. For example, going faster usually means a larger diameter chainring, while vehicle clearance calls for a smaller diameter chainring. As such, there is constant innovation and invention within the field of chainring assemblies, innovation and invention that requires more than simple substitution of parts in order to increase the desired performance while reducing the detrimental downside associated therewith.

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

For purposes of the following discussion, the term "chainring" (or chainwheel) refers to one or more toothed components that are located at the crank assembly of a vehicle (e.g., where the cranks and pedals are located). The chainring rotates in either a clockwise or counterclockwise direction based on input from the rider provided via a pedal (or crank).

The term "sprocket" refers to the one or more toothed components that are found at the drive wheel of a vehicle (usually the rear wheel). The rotation of the one or more sprockets (in the appropriate direction) causes the drive wheel of the vehicle to rotate.

The term "roller chain" refers to the chain on a vehicle, such as a bicycle, that fits into the teeth of the chainring and the teeth of the sprocket to form a mechanical connection between the two. Thus, as the chainring is rotated, usually by peddling or the like, movement of the roller chain occurs. The movement of the roller chain about the chainring and the sprocket causes a movement of the sprocket at the drive wheel of the bicycle.

The amount of rotational movement of the sprocket depends upon the size ratio between the chainring and the sprocket. For example, if the ratio is 1:1, (e.g., the chainring and sprocket are the same tooth count) a rotation of the chainring will cause the roller chain to rotate the sprocket the same amount. However, if the ratio is 2:1, (e.g., the chainring has twice the tooth count of the sprocket) a rotation of the chainring will cause the roller chain to rotate the sprocket twice as much. For example, a full revolution of the chainring will result in two full rotations of the sprocket.

Overview

In one embodiment of the chainring assembly described herein create a chainring assembly that employs two separate chainrings held on to one spline using only one fastener. In so doing, the chainring assembly can be built at a lower cost than is found in many conventional chainring assemblies while still meeting or exceeding conventional chainring assembly strength and stiffness criteria. Moreover, each of the chainrings can be individually or jointly replaced due to wear, different gearing ratios, personal preference, terrain being traversed, riding requirements, or the like.

By allowing either chainring to take part of the torque from the other chainring utilizing the spline on the chainring assembly interface, a more robust chainring assembly interface is provided. Moreover, due to the stacking or nesting of the two chainrings, the amount of central movement between the two chainrings is limited and, as such, a robust and stronger way of transferring the torque from the crank onto either chainring and then on to the roller chain is provided.

Further, deviation in a radial alignment of the two chainrings is detrimental to shifting performance. However, in one embodiment, due to the stacking or nesting of the two chainrings, the radial alignment between the two chainrings is maintained. Maintaining radial alignment between the two chainrings is important for shifting performance, e.g., when the roller chain is shifted between the two chainrings.

Operation

Figure 1A:
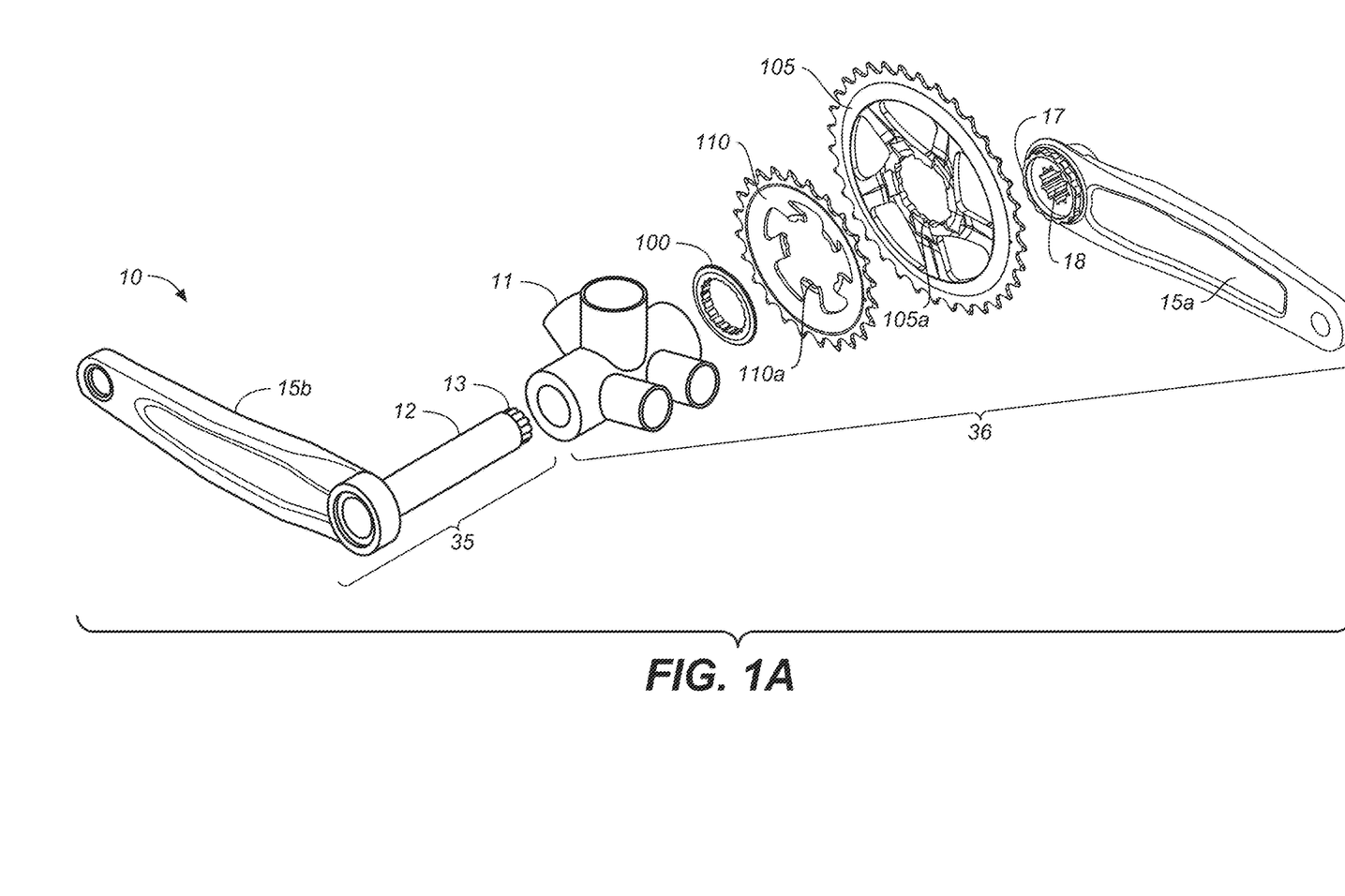
FIG. 1A is an exploded view of a crank assembly, in accordance with an embodiment.

FIG. 1A is an exploded view of a crank assembly 10, in accordance with an embodiment. In one embodiment, crank assembly 10 is shown in conjunction with bicycle frame and bottom bracket portion 11 where it is mounted. Crank assembly 10 includes a left hand non-drive crank assembly 35 which includes a left hand crank arm 15b and a spindle 12 having a spindle interface 13. Crank assembly 10 also includes a right hand drive side crank assembly 36 which includes a drive side crank arm 15a, a fastener 100, a first chainring 105, and a second chainring 110. In one embodiment, drive side crank arm 15a includes a chainring assembly interface 17 (having a number of splines 17n thereon) and a spindle interface 18. Examples of fastener 100 include, but are not limited to, a lock ring, a plurality of bolts arranged radially about the central axis of the crank (i.e. a bolt circle), and the like.

During assembly, fastener 100 will fixedly couple first chainring 105 and second chainring 110 with chainring assembly interface 17 of right hand drive side crank arm 15a thereby forming the right hand drive side crank assembly 36. Spindle 12 is inserted through bicycle frame bottom bracket portion 11 and spindle interface 13 couples with spindle interface 18 on right hand drive side crank assembly 36. In one embodiment, crank assembly 10 includes one or more additional parts such as, but not limited to, pedals, a pedal washers, a preloader, dust caps, spindle spacers, bearings, hex nuts, preload adjusters, and the like. However, those parts are not shown for purposes of clarity.

In one embodiment, first chainring 105 has a first diameter and a plurality of teeth about an outer perimeter thereof. In one embodiment, first chainring 105 has 34 teeth. Although 34 teeth are described in one embodiment, the technology is well suited to the use of various other numbers of teeth such as 28, 30, 38, or the like. In one embodiment, first chainring 105 is comprised of a first material. In one embodiment, the first material is a metallic component, e.g., aluminum, titanium, steel, or the like.

First chainring 105 includes a (first) center assembly shape 105a having an inner diameter. In one embodiment, center assembly shape 105a differs depending upon the engagement method between first chainring 105 and chainring assembly interface 17. In one embodiment, center assembly shape 105a is used to transfer the load (or torque) from crank assembly 10 to first chainring 105 and then on to the roller chain.

In one embodiment, second chainring 110 has a second diameter, different than the diameter of first chainring 105, and has a plurality of teeth about an outer perimeter thereof. In one embodiment, second chainring 110 has 24 teeth. Although 24 teeth are described in one embodiment, the technology is well suited to the use of various other numbers of teeth such as 20, 14, 10, or the like. In one embodiment, second chainring 110 is made from the same material as first chainring 105. In another embodiment, first chainring 105 and second chainring 110 are made from different materials.

Second chainring 110 includes a (second) center assembly shape 110a having an inner diameter. In one embodiment, center assembly shape 110a differs depending upon the engagement method between second chainring 110 and chainring assembly interface 17. In one embodiment, center assembly shape 110a is used to transfer the load (or torque) from crank assembly 10 to second chainring 110 and then on to the roller chain.

Figure 1B:
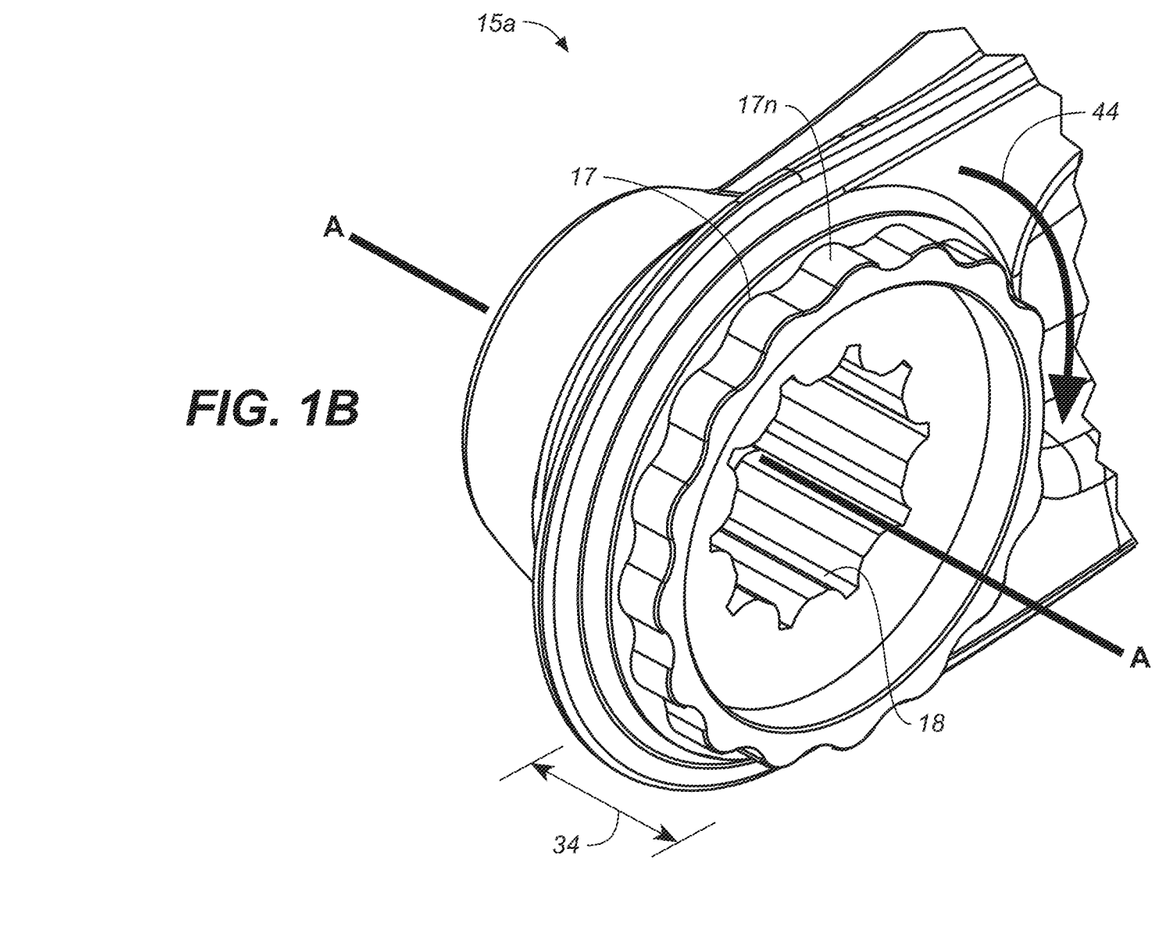
FIG. 1B is a side view of a crank arm with a spline, in accordance with an embodiment.

Referring now to FIG. 1B, a close up side view of drive side crank arm 15a with chainring assembly interface 17, splines 17n, and spindle interface 18 is shown in accordance with an embodiment. In FIG. 1B, an axis A-A is shown. In addition, a circumference 44 and an axial length 34 of chainring assembly interface 17 are shown in orientation with the axis A-A.

Figure 2A:
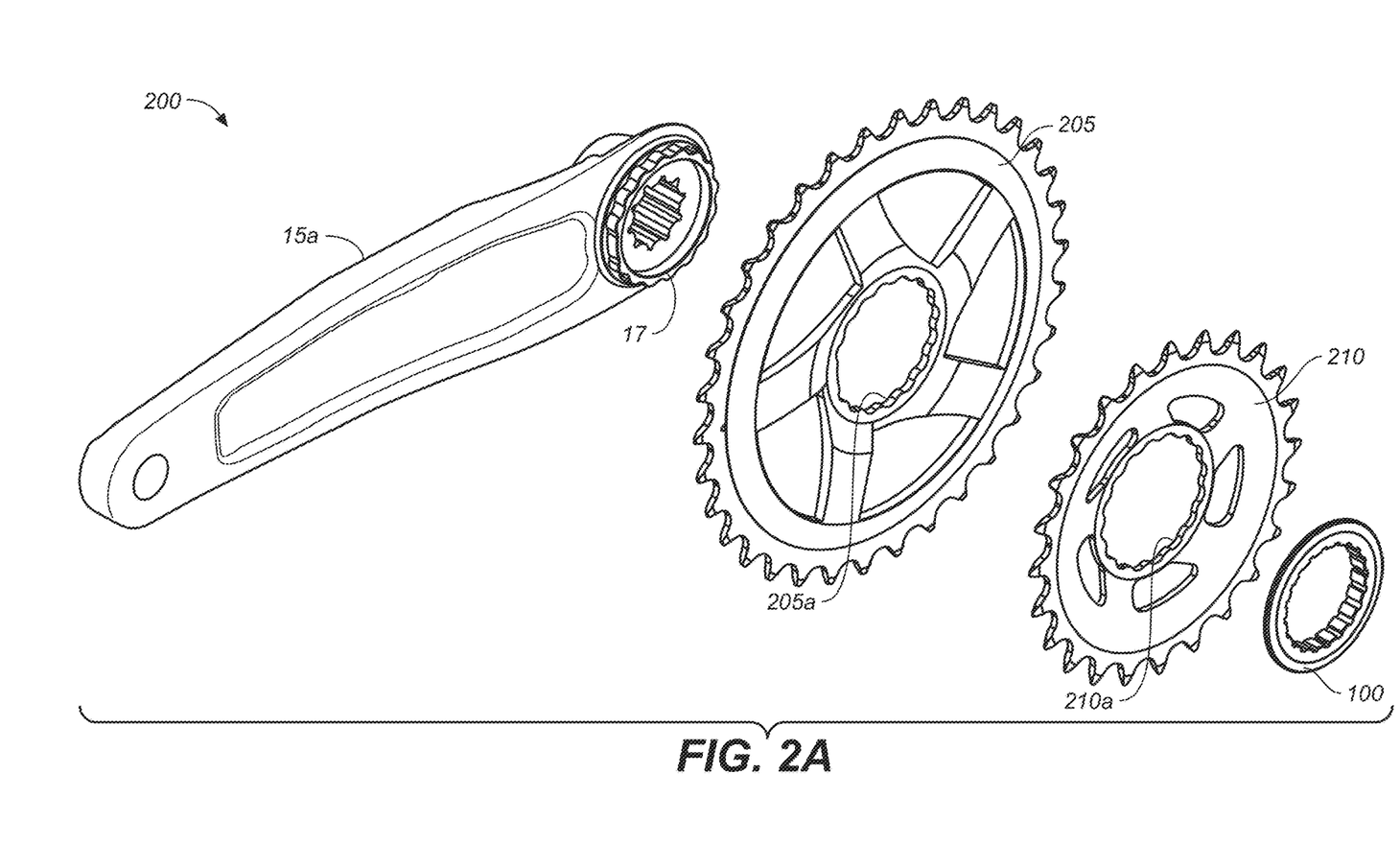
FIG. 2A is an exploded view of a chainring assembly having all splines engaged by each chainring, in accordance with an embodiment.

With reference now to FIG. 2A, an exploded view of a chainring assembly 200 having all splines engaged by each chainring is shown in accordance with an embodiment. Chainring assembly 200 includes right hand drive side crank arm 15a, chainring assembly interface 17, a first chainring 205 having a (first) center assembly shape 205a, a second chainring 210 having a (second) center assembly shape 210a, and fastener 100.

Figure 2B:
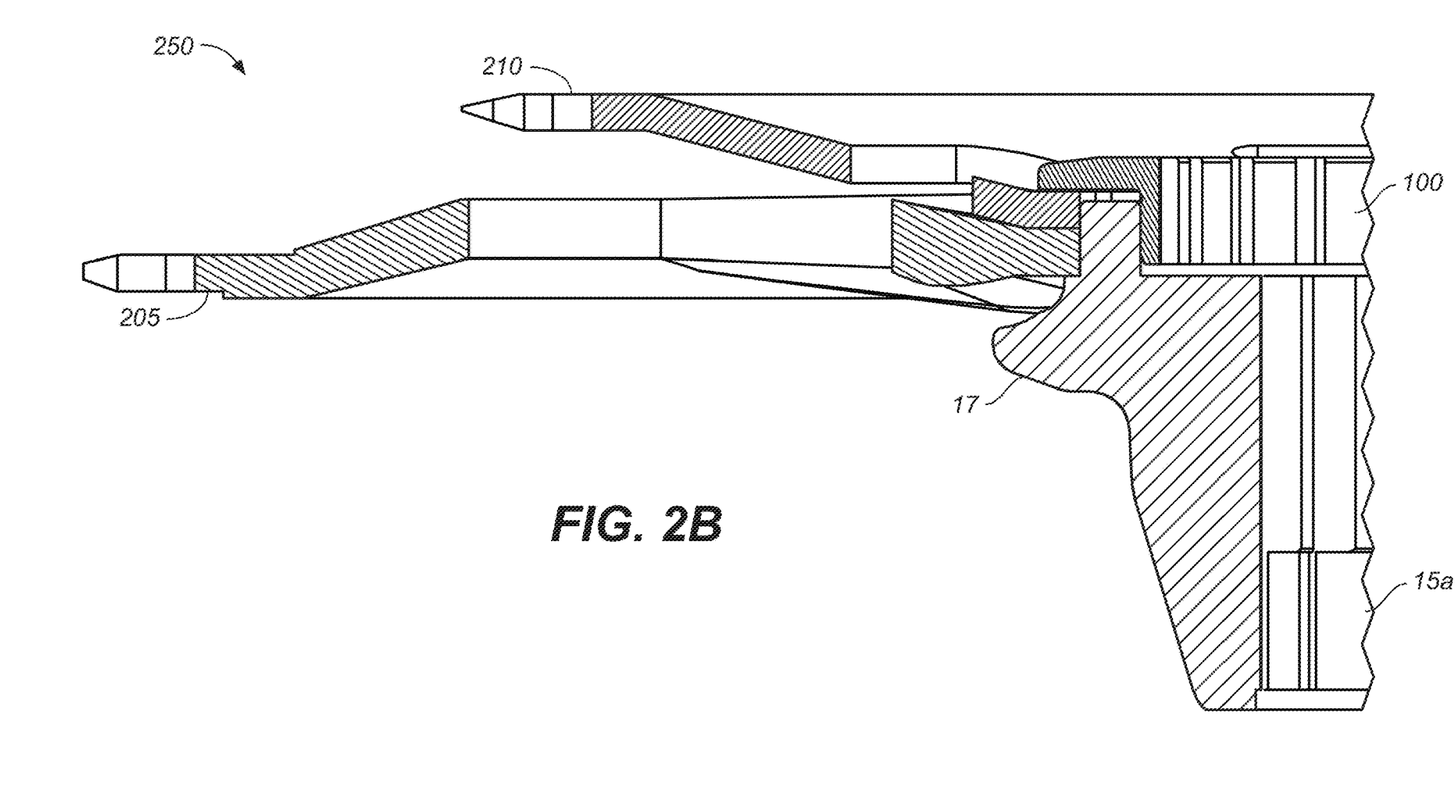
FIG. 2B is a cross-section view of the chainring assembly of FIG. 2A, in accordance with an embodiment.

Referring also to FIG. 2B, a cross-section view 250 of the chainring assembly 200 of FIG. 2A is shown in accordance with an embodiment. In chainring assembly 200, all splines 17n about chainring assembly interface 17 are engaged by first chainring 205 and second chainring 210. For example, in chainring assembly 200 center assembly shape 205a of first chainring 205 uses a first portion of available axial length 34 of chainring assembly interface 17 and center assembly shape 210a of second chainring 210 uses a second portion of available axial length 34 such that both first chainring 205 and second chainring 210 make contact with splines 17n about the full circumference 44 of chainring assembly interface 17. In so doing, the torque is distributed directly from crank assembly 10 to each of first chainring 205 and second chainring 210 separately.

Figure 3A:
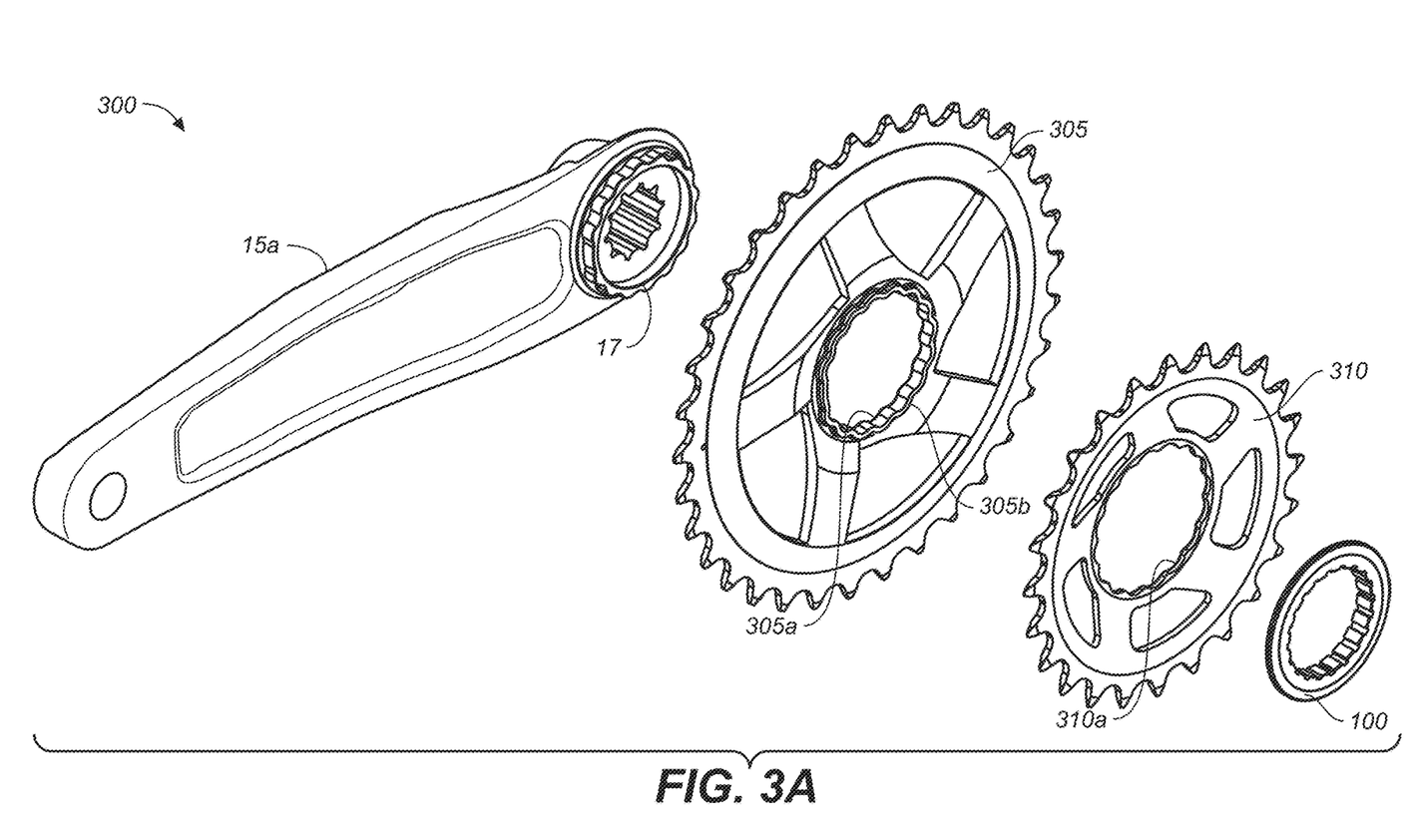
FIG. 3A is an exploded view of a chainring assembly having all splines engaged by a first chainring, in accordance with an embodiment.

With reference now to FIG. 3A, an exploded view of a chainring assembly 300 having all splines 17n engaged by first chainring 305 is shown in accordance with an embodiment. Chainring assembly 300 includes right hand drive side crank arm 15a, chainring assembly interface 17, a first chainring 305 having a center assembly shape 305a, a second chainring 310 having a center assembly shape 310a, and fastener 100.

Figure 3B:
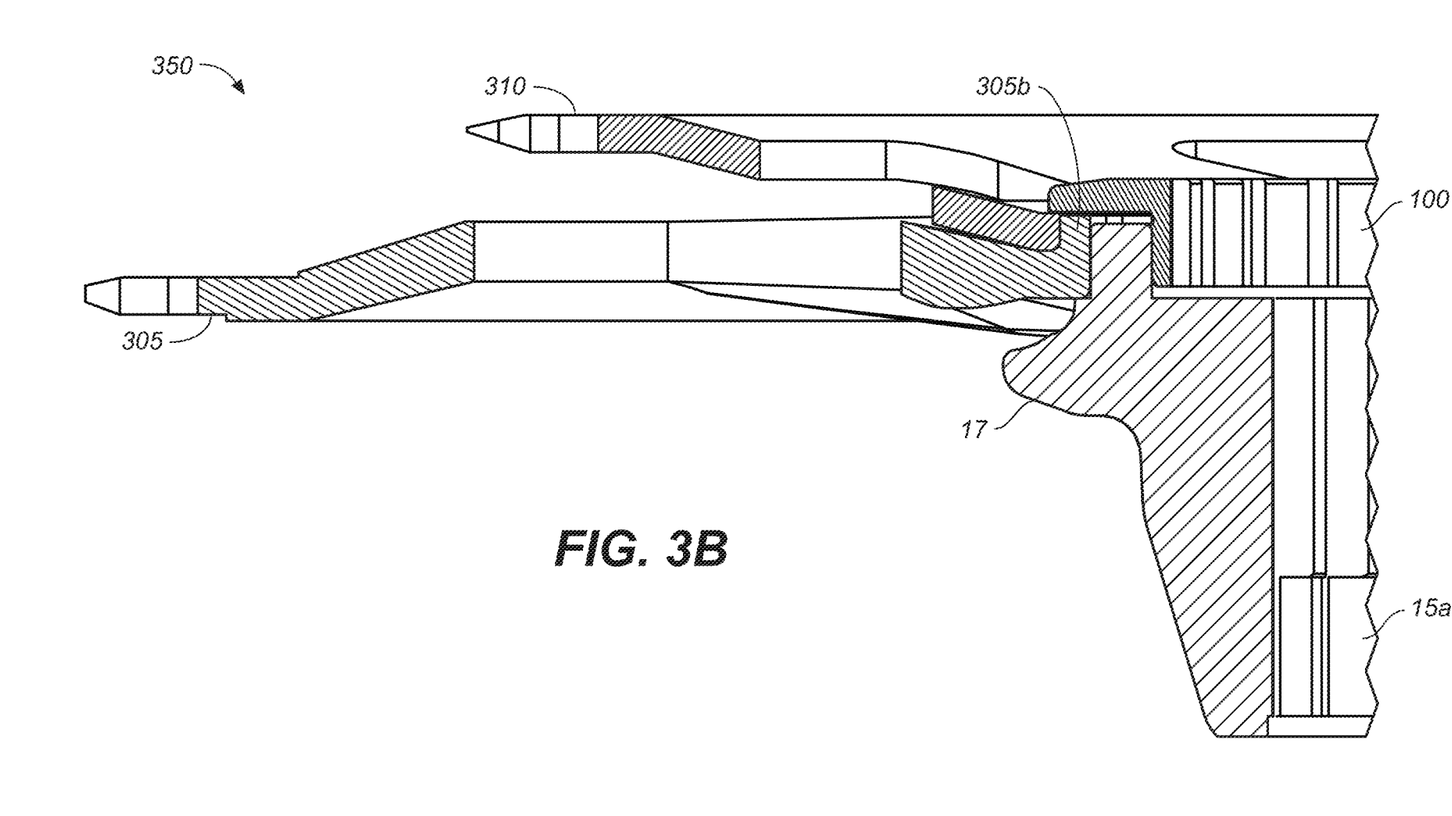
FIG. 3B is a cross-section view of the chainring assembly of FIG. 3A, in accordance with an embodiment.

Referring also to FIG. 3B, a cross-section view 350 of the chainring assembly 300 of FIG. 3A is shown in accordance with an embodiment. In chainring assembly 300, all splines 17n about chainring assembly interface 17 are engaged by first chainring 305. For example, in chainring assembly 300 center assembly shape 305a of first chainring 305 uses the available axial length 34 of chainring assembly interface 17 around the entire circumference 44.

Moreover, center shape 305a of first chainring 305 has an outer diameter of splines 305b (e.g., a secondary chainring interface). As such, when a second chainring 310 is utilized, the center assembly shape 310a of second chainring 310 makes contact with splines 305b instead of contacting the splines 17n of chainring assembly interface 17. In so doing, the torque is always transferred through the first chainring 305. Thus, when the second chainring 310 is utilized, the torque is transferred from crank assembly 10 to first chainring 305 and then into second chainring 310 through the secondary chainring interface, e.g., splines 305b of first chainring 305.

Figure 4A:
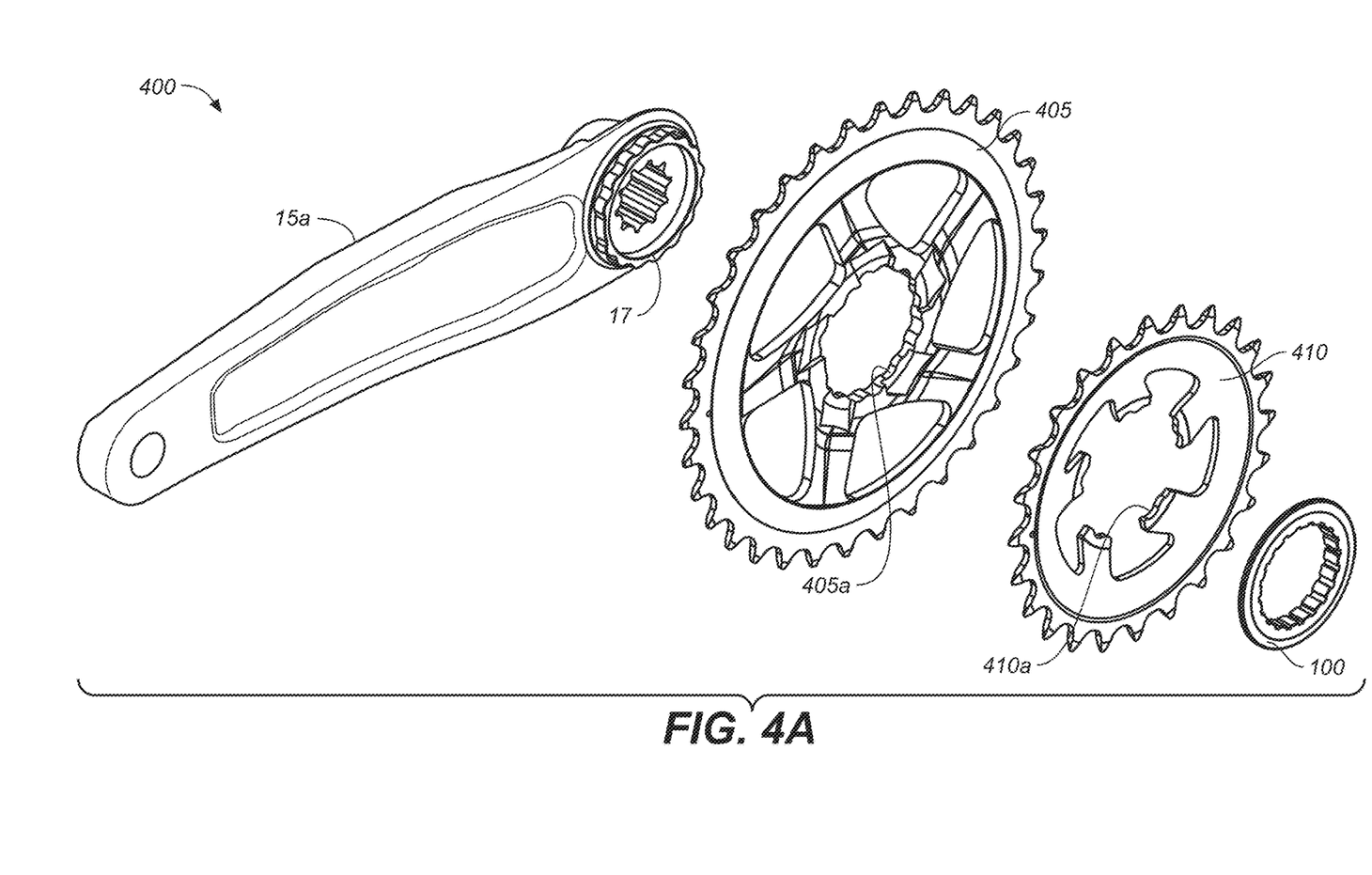
FIG. 4A is an exploded view of a chainring assembly having a first circumferential portion of splines engaged by each chainring together with a remaining circumferential portion engaged only by one chainring, in accordance with an embodiment.

With reference now to FIG. 4A, an exploded view of a chainring assembly 400 having a first circumferential portion of circumference 44 of splines 17n engaged by both first chainring 405 and second chainring 410 together and a remaining circumferential portion of circumference 44 of splines 17n engaged only by first chainring 405 is shown in accordance with an embodiment. Chainring assembly 400 includes right hand drive side crank arm 15a, chainring assembly interface 17, a first chainring 405 having a center assembly shape 405a, a second chainring 410 having a center assembly shape 410a, and fastener 100.

Figure 4B:
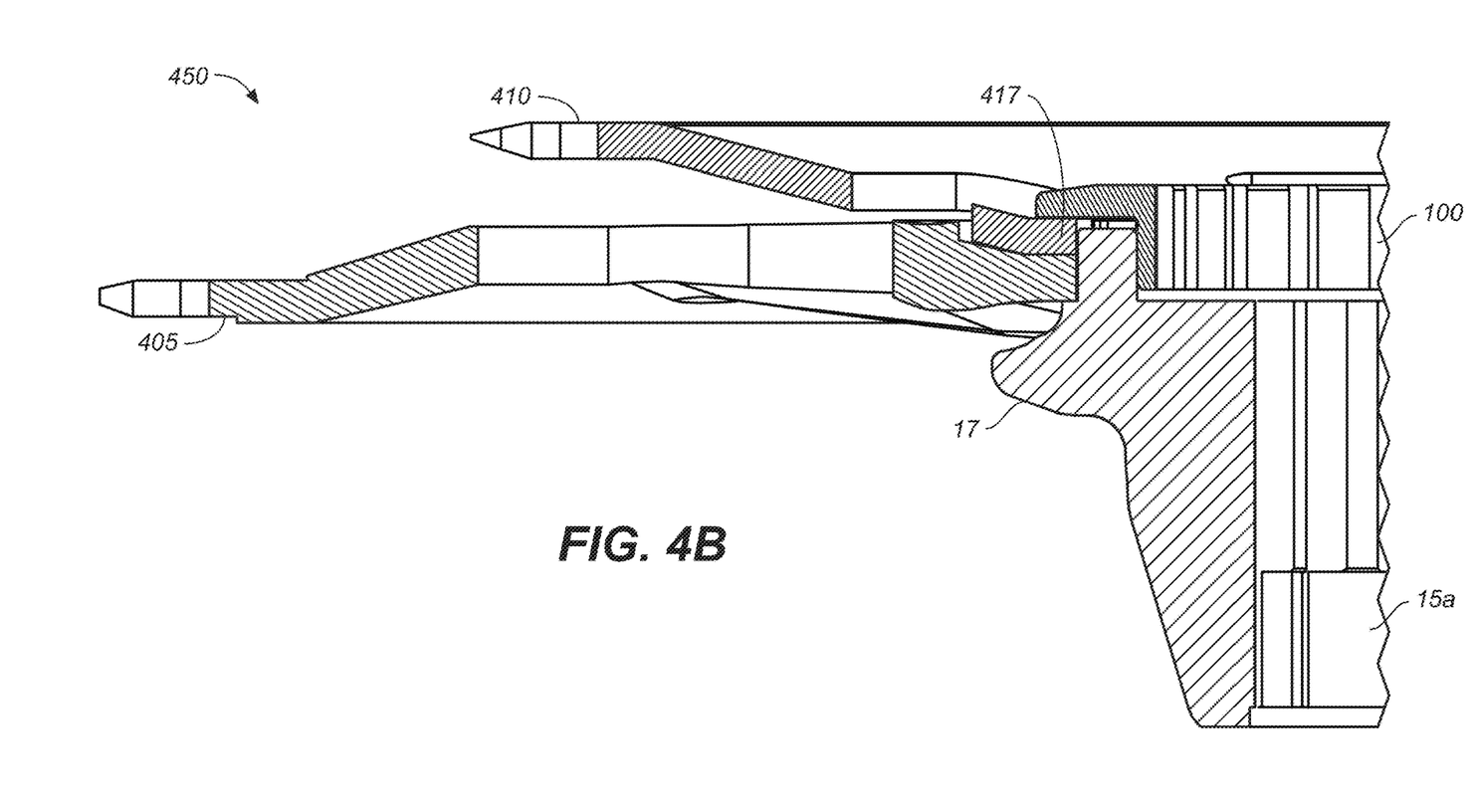
FIG. 4B is a cross-section view of the chainring assembly of FIG. 4A, in accordance with an embodiment.

Referring also to FIG. 4B, a cross-section view 450 of the chainring assembly 400 of FIG. 4A is shown in accordance with an embodiment. In chainring assembly 400, a first circumferential portion of circumference 44 of splines 17n of chainring assembly interface 17 are engaged by both first chainring 405 and second chainring 410 together and a remaining circumferential portion of circumference 44 of splines 17n of chainring assembly interface 17 are engaged only by first chainring 405. For example, in chainring assembly 400 center assembly shape 405a of first chainring 405 has a number of depth features 405b sections therein. As such, some sections of center assembly shape 405a uses the entire axial length 34 of chainring assembly interface 17, while other sections of center assembly shape 405a only use a first portion of available axial length 34 of chainring assembly interface 17.

Center assembly shape 410a of second chainring 410 has a number of arm type features that fit within the depth features 405b sections of center assembly shape 405a that use only the first portion of available axial length 34. As such, the arm type features of center assembly shape 410a use a second portion of available axial length 34 such that center assembly shape 405a of first chainring 405 makes contact with splines 17n about the full circumference 44 of chainring assembly interface 17 while center assembly shape 410a of second chainring 410 makes contact 417 with only a portion of splines 17n about the circumference 44 of chainring assembly interface 17 at depth features 405b. In so doing, the torque is proportionally distributed from crank assembly 10 to each of first chainring 405 and second chainring 410 proportional to the surface area of splines 17n engaged by each chainring.

Figure 5A:
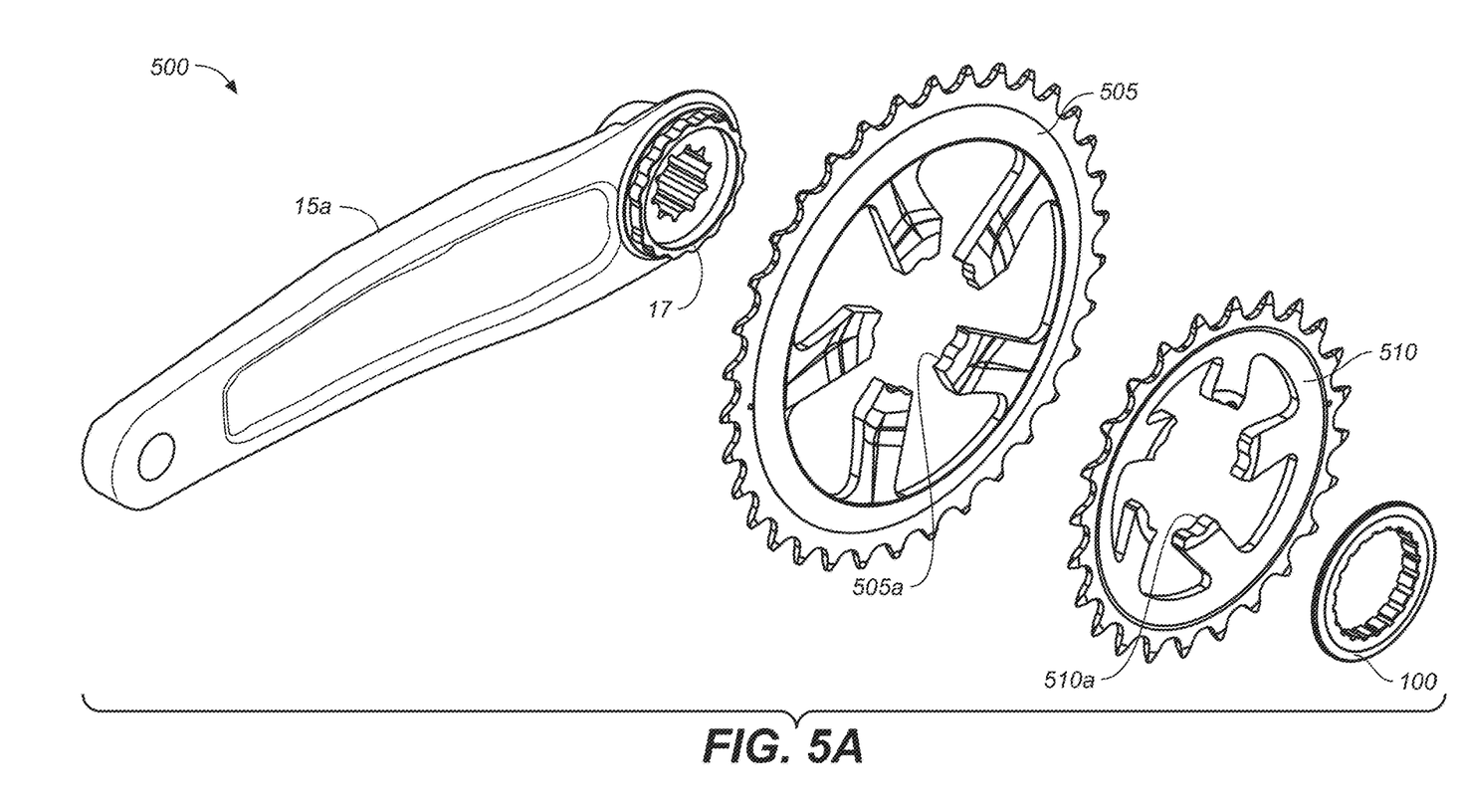
FIG. 5A is an exploded view of a chainring assembly having a first circumferential portion of splines engaged by a first chainring and a remaining circumferential portion engaged by a second chainring, in accordance with an embodiment.

With reference now to FIG. 5A, an exploded view of a chainring assembly 500 having a first circumferential portion of circumference 44 of splines 17n of chainring assembly interface 17 engaged by a first chainring 505 and a remaining circumferential portion of circumference 44 of splines 17n of chainring assembly interface 17 engaged by a second chainring 510 is shown in accordance with an embodiment. Chainring assembly 500 includes right hand drive side crank arm 15a, chainring assembly interface 17, a first chainring 505 having a center assembly shape 505a, a second chainring 510 having a center assembly shape 510a, and fastener 100.

Figure 5B:
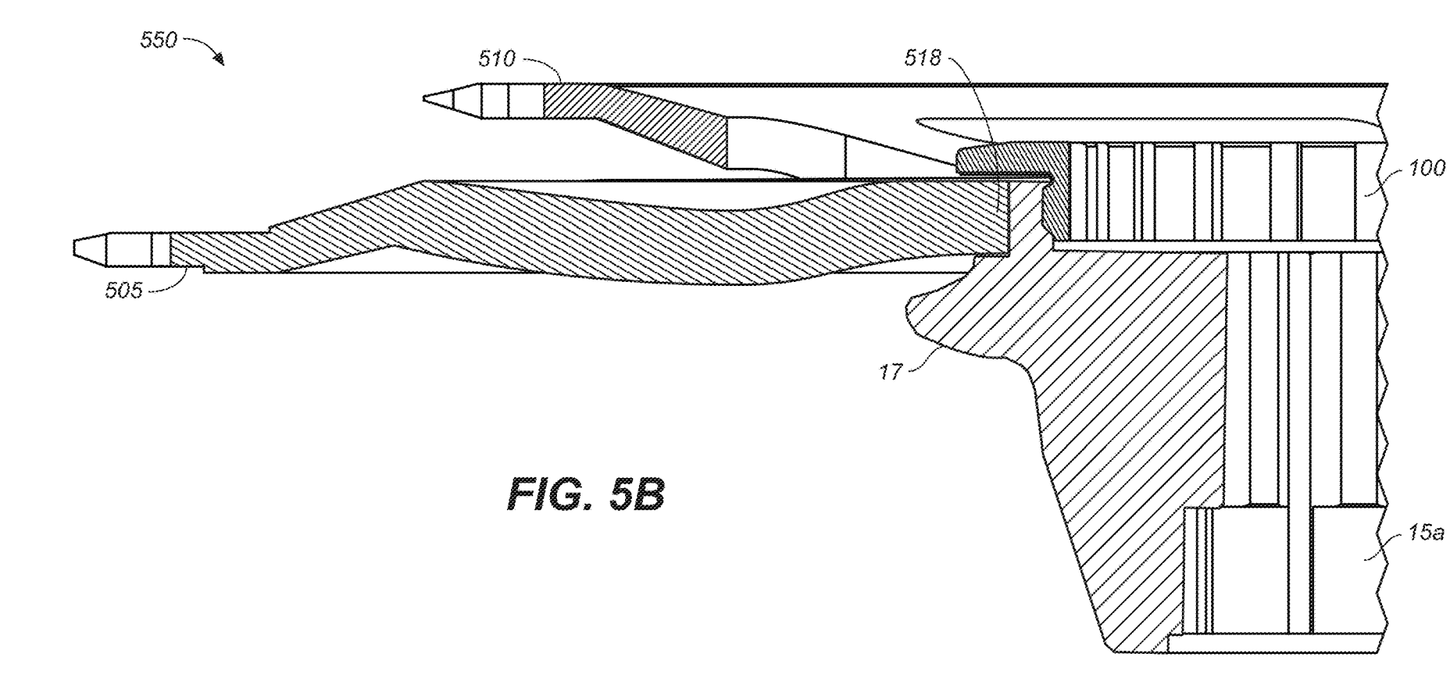
FIG. 5B is a cross-section view of the chainring assembly of FIG. 5A, in accordance with an embodiment.

Referring also to FIG. 5B, a cross-section view 550 of the chainring assembly 500 of FIG. 5A is shown in accordance with an embodiment. In chainring assembly 500, a first circumferential portion of circumference 44 of splines 17n of chainring assembly interface 17 are engaged by a center assembly shape 505a of first chainring 505 and the remaining circumferential portion of circumference 44 of splines 17n of chainring assembly interface 17 are engaged by a center assembly shape 510a of second chainring 510. For example, in chainring assembly 500 center assembly shape 505a of first chainring 505 has a number of arm type features that use the entire available axial length 34 across only a portion of circumference 44 of chainring assembly interface 17.

Similarly, center assembly shape 510a of second chainring 510 has a number of arm type features that use the entire available axial length 34 across only a portion of circumference 44 of chainring assembly interface 17. However, the arm type features of center assembly shape 510a of second chainring 510 are offset from the arm type features of center assembly shape 505a of first chainring 505. As such, the arm type features of center assembly shape 505a mesh with the arm type features of center assembly shape 510a such that the combination of center assembly shape 505a and center assembly shape 510a results in complete contact 518 with splines 17n about the full circumference 44 and across the entire axial length 34 of chainring assembly interface 17. In so doing, the torque is proportionally distributed from crank assembly 10 to each of first chainring 405 and second chainring 410 proportional to the surface area of splines 17n engaged by each chainring.

Figure 6A:
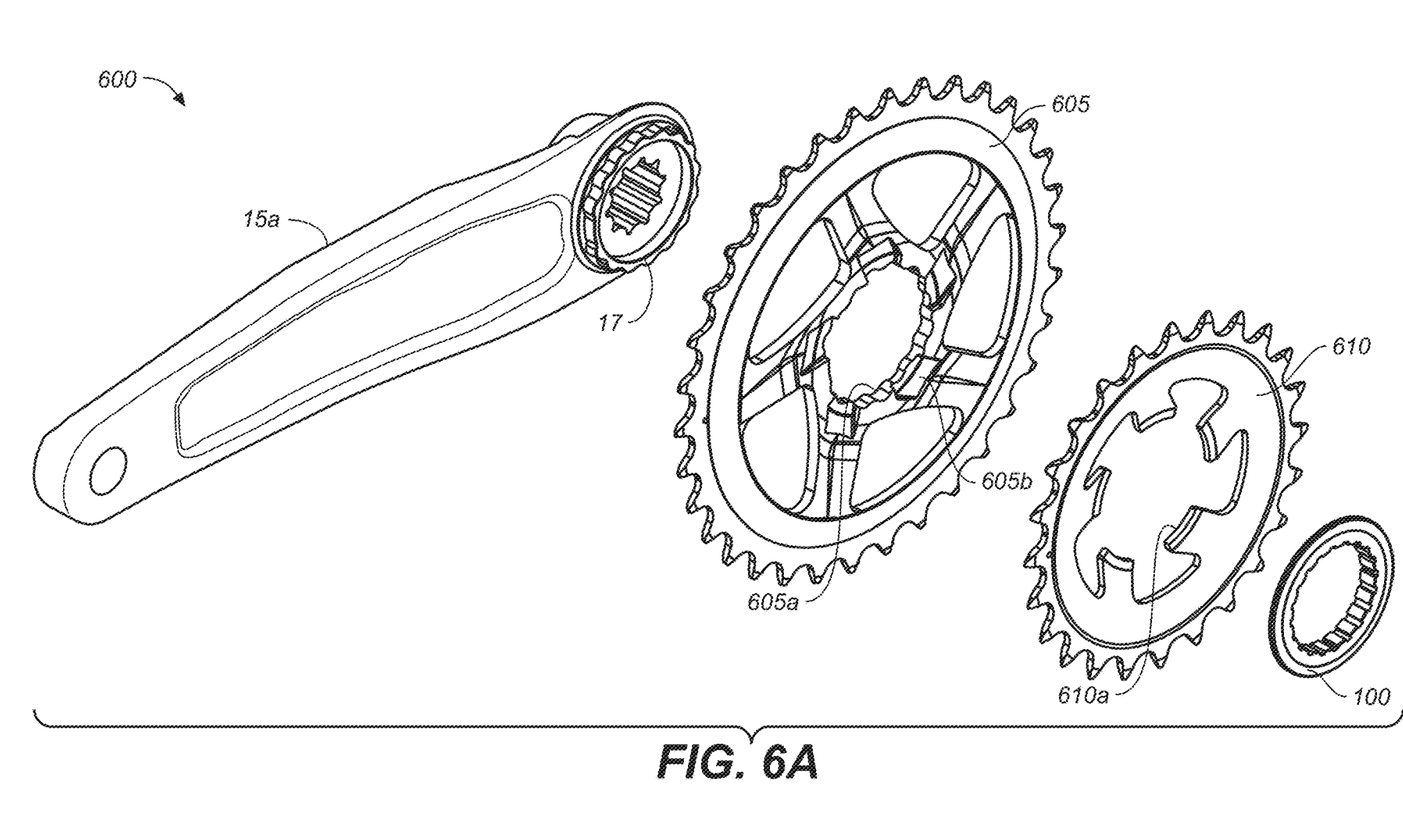
FIG. 6A is an exploded view of a chainring assembly having an entire circumferential portion of splines engaged by a first chainring and a remaining axial space filled by a second chainring without the second chainring engaging any portion of the splines, in accordance with an embodiment.

With reference now to FIG. 6A, an exploded view of a chainring assembly 600 having an entire circumferential portion of circumference 44 of splines 17n of chainring assembly interface 17 engaged by a first chainring and a remaining axial space of axial length 34 of chainring assembly interface 17 filled by a second chainring 610 without the second chainring 610 engaging any portion of the splines 17n is shown in accordance with an embodiment. Chainring assembly 600 includes right hand drive side crank arm 15a, chainring assembly interface 17, a first chainring 605 having a center assembly shape 605a, a second chainring 610 having a center assembly shape 610a, and fastener 100.

Figure 6B:
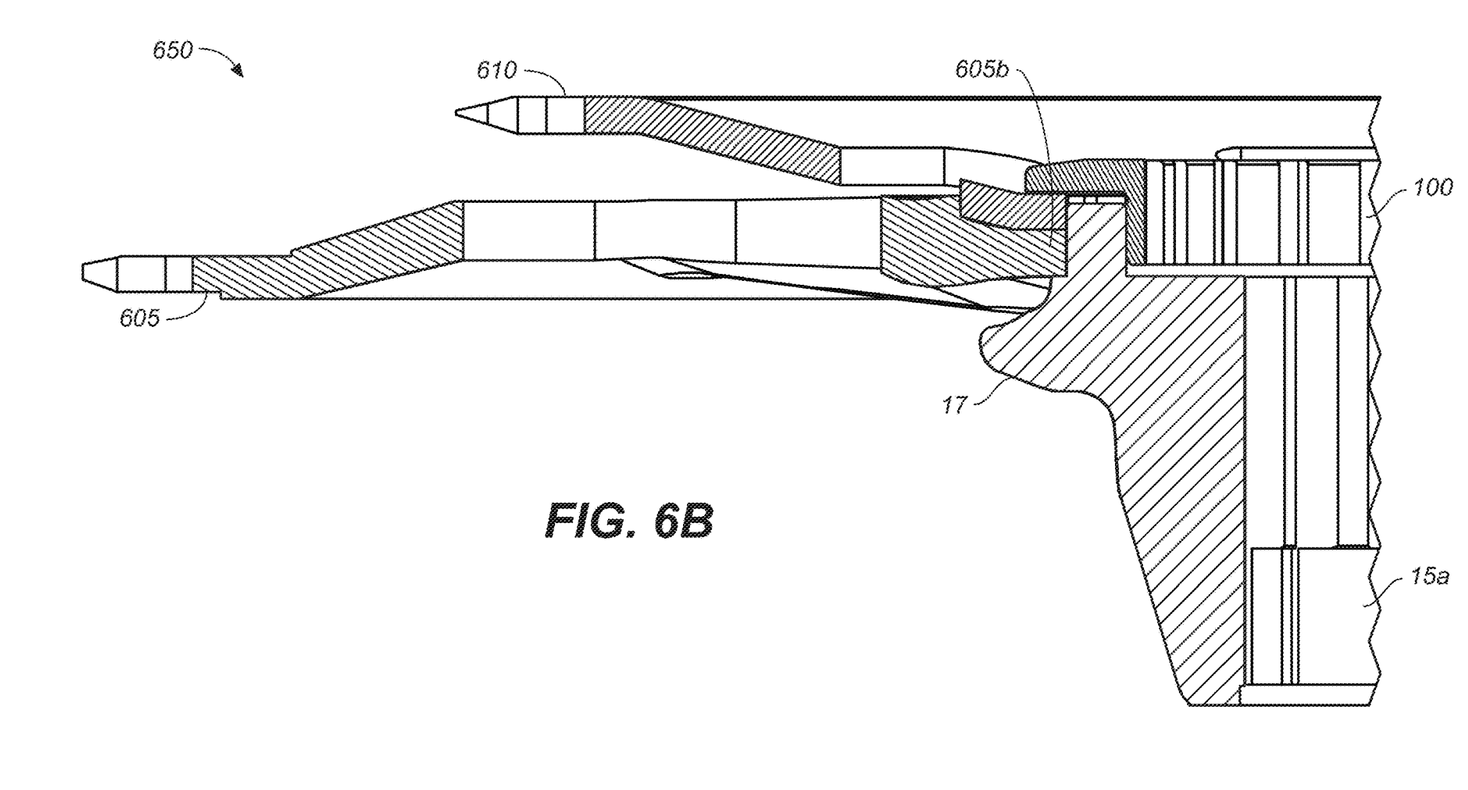
FIG. 6B is a cross-section view of the chainring assembly of FIG. 6A, in accordance with an embodiment.

Referring also to FIG. 6B, a cross-section view 650 of the chainring assembly 600 of FIG. 6A is shown in accordance with an embodiment. In chainring assembly 600, a first circumferential portion of circumference 44 of splines 17n of chainring assembly interface 17 are engaged by both first chainring 605 and second chainring 610 together and a remaining circumferential portion of circumference 44 of splines 17n of chainring assembly interface 17 are engaged only by first chainring 605. For example, in chainring assembly 600 center assembly shape 605a of first chainring 605 has a number of depth features therein. As such, some sections of center assembly shape 605a uses the entire axial length 34 of chainring assembly interface 17, while other sections of center assembly shape 605a only use a first portion of available axial length 34 of chainring assembly interface 17.

Center assembly shape 610a of second chainring 610 has a number of arm type features that fit within the depth features 605b sections of center assembly shape 605a that use only the first portion of available axial length 34 of chainring assembly interface 17. In one embodiment, the arm type features of center assembly shape 610a fit within the depth features 605b sections and use the second portion of available axial length 34 of chainring assembly interface 17. Moreover, the arm type features of center assembly shape 610a fit within the depth features 605b sections without engaging splines 17n of chainring assembly interface 17.

In other words, second chainring 610 is fixed rotationally to first chainring 605 using assembly features (e.g. press, taper, or slip fit) to ensures radial and also rotational alignment between the two chainrings without the use of extra hardware. As such, second chainring 610 is located radially by spline interface without any torque being transmitted from splines 17n to second chainring 610. Instead, because of 605b, all torque is transmitted from crank assembly 10 though first chainring 605 via splines 17n of chainring assembly interface 17. As such, when second chainring 610 is in use, the torque is transmitted through crank assembly 10, into first chainring 605 and then into second chainring 610.

Thus, embodiments described herein provide a chainring assembly that employs two separate chainrings held on to one spline using only one fastener. In so doing, the chainring assembly can be built at a lower cost than is found in many conventional chainrings while still meeting or exceeding conventional chainring assembly strength and stiffness criteria. Moreover, each of the chainrings can be individually or jointly replaced due to wear, different gearing ratios, personal preference, terrain being traversed, riding requirements, or the like.

By allowing either chainring to take part of the torque from the other chainring utilizing the axial length and/or circumference of the spline of the chainring assembly interface, a more robust chainring assembly interface is provided. Moreover, due to the stacking or nesting of the two chainrings, the amount of central movement between the two chainrings is limited and, as such, a robust and stronger way of transferring the torque from the crank onto either chainring and then on to the roller chain is provided.

Further, deviation in a radial alignment of the two chainrings is detrimental to shifting performance. Thus, in one embodiment, due to the stacking or nesting of the two chainrings, the radial alignment between the two chainrings is maintained. Maintaining radial alignment between the two chainrings is important for shifting performance, e.g., when the roller chain is shifted between the two chainrings.

In one embodiment, depending upon the type of bicycle being used the diameter of the chainrings can be larger or smaller and the diameter of the chainring is directly proportional to chainring flex. For example, in a mountain bike, trick bike, BMX bike, or the like, the chainrings normally have a smaller diameter (e.g., 2-5 inches) to keep the ground clearance at a maximum. The small diameter of the chainrings helps limit any chainring flex even when the chainrings are fixed in place with a single central fastener or a plurality of radial located fasteners at a central area thereof.

However, in the case of a road bike or other type of bicycle that is used in an environment where ground clearance is not as big of a concern as top speed, it is possible that one or both of the chainrings could be larger in diameter (e.g., 6-10 inches or more). If one or both of the chainrings are large in diameter, there could be some amount of chainring flex due to the chainrings being fixed in place with a single central fastener or a plurality of radial located fasteners at a central area thereof. As such, at least one connection of some type between the two chainrings at a location further from the central axis of the chainrings could be useful to reduce chainring flex. The at least one connection could be at least one removably coupleable connection between the two chainrings such as an adhesive, or it could be at least one fixedly coupleable connection between the two chainrings such as one or more rivets, welds, bolts, screws, or other fasteners.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A bicycle chainring assembly comprising:
a drive side crank arm comprising a chainring assembly interface,
the chainring assembly interface having a circumference and an axial length;
a first chainring having a first outer diameter and a first center assembly shape,
the first outer diameter having a plurality of teeth thereon;
a second chainring having a second outer diameter and a second center assembly shape,
the second outer diameter having a plurality of teeth thereon,
the second outer diameter being different than the first outer diameter;
a single fastener to couple the first chainring and the second chainring with the chainring assembly interface, such that at least one of the first center assembly shape or the second center assembly shape engages with the chainring assembly interface, the first center assembly shape comprising:
an inner diameter that engages with the chainring assembly interface about the circumference of the chainring assembly interface over an entirety of the axial length; and
an outer diameter comprising a plurality of splines about the circumference of the first center assembly shape,
the plurality of splines having a second axial length; and
the second center assembly shape engages with the plurality of splines about the circumference of the first center assembly shape over an entirety of the second axial length.

* * * * *